Nov. 24, 1925.
F. W. TRENN
CHUCK
Filed Aug. 5, 1922
1,562,602
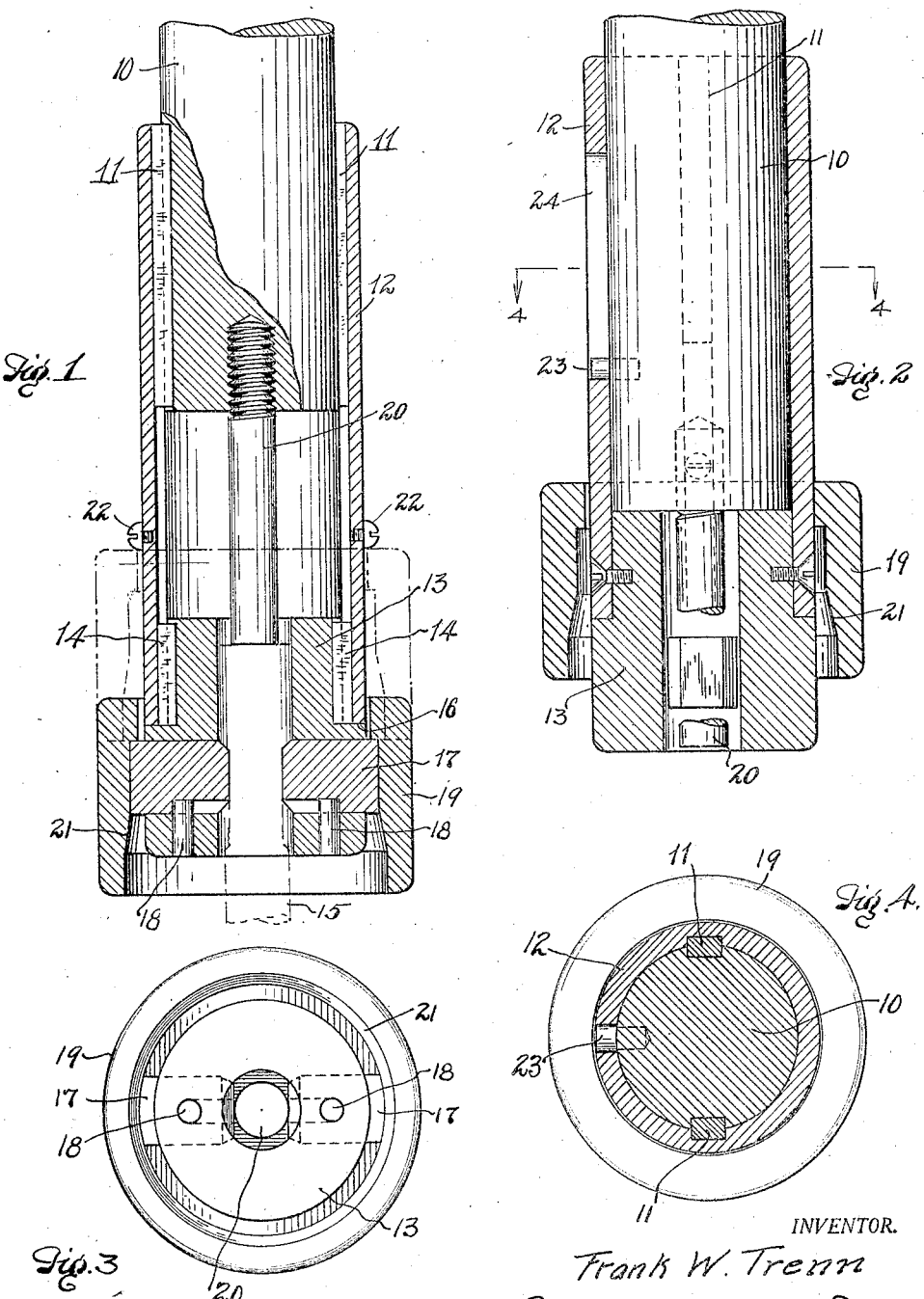
INVENTOR.
Frank W. Trenn
By Fay, Oberlin & Fay
ATTORNEYS.

Patented Nov. 24, 1925.

1,562,602

UNITED STATES PATENT OFFICE.

FRANK W. TRENN, OF WILLOUGHBY, OHIO, ASSIGNOR TO THE ECONOMY ENGINEERING COMPANY, OF WILLOUGHBY, OHIO, A CORPORATION OF OHIO.

CHUCK.

Application filed August 5, 1922. Serial No. 579,785.

*To all whom it may concern:*

Be it known that I, FRANK W. TRENN, a citizen of the United States, residing at Willoughby, in the county of Lake and in the State of Ohio, have invented certain new and useful Improvements in Chucks, of which the following is a specification.

Although not confined thereto the chuck is specifically adapted to hold a drill or tap in a vertical spindle.

In the accompanying drawings Figure 1 is a transverse vertical section of one form my invention may take. Fig. 2 is a transverse vertical section of the same taken at right angles to the section of Fig. 1. Fig. 3 is a bottom plan view of the chuck and Fig. 4 is a transverse horizontal section on the line 4—4 of Fig. 2.

For purposes of illustration I have shown a shaft or spindle 10 which may be rotated by any suitable means (not shown). Longitudinal keys 11 enter key ways in the shaft 10. A sleeve 12 surrounds the shaft 10 and has key ways to engage the keys 11 so that the sleeve 12 has longitudinal movement on the shaft 10. A hollow head 13 has a reduced end extending into the sleeve 12 in which it is held against rotation by keys 14. The head 13 has a central longitudinal bore into which may project the drill or tap 15 shown in dotted lines in Fig. 1. The portion of the head 13 which projects from the sleeve 12 is enlarged to form shoulders 16 against which the end of the sleeve 12 is seated. The projecting end of the head 13 has transverse apertures in which fit cylindrical jaws 17, the inward movement of which is limited by pins 18 projecting into recesses in the jaws 17. In addition to limiting the inward movement of the jaws 17 the pins 18 hold the jaws from turning or rotating in their seats. A collar 19 surrounds the lower end of the sleeve 12 and projects downward so as to engage the outer end of the jaws 17 and hold them in their innermost position as illustrated in full lines in Fig. 1. In this position the beveled noses of the jaws 17 engage the formed seats in the tap and hold it against rotation and snugly in contact with an ejector pin 20 projecting from the lower end of the shaft 10 into which the pin 20 is tapped. The lower end of the collar 19 is larger in interior diameter than the seat for the jaws 17 and a beveled portion 21 connects the two faces of the collar 19.

The collar 19 may slide upward on the sleeve 12 as indicated in dotted lines in Fig. 1. Screws 22 in the sleeve 12 limit the upward movement of the collar 19. A pin 23 projecting from the shaft 10 into a longitudinal slot 24 in the sleeve 12 limits the sliding movement of the sleeve 12 on the shaft 10. Screws counter-sunk in the lower end of the sleeve 12 are tapped into the head 13 and hold it in the sleeve 12.

It will be seen in Fig. 2 that the collar 19 has been raised to allow the jaws 17 to recede and release the tap 15. The sleeve 12 carrying the collar 19 and the head 13 has been raised so as to cause the ejector 20 to force the tap out of the chuck.

In order to insert the tap the sleeve 12 may be dropped to the position shown in full lines in Fig. 1. The collar 19 may then be raised to the position shown in dotted lines in Fig. 1 which will allow the jaws 17 to recede so that the tap 15 may be inserted into the head 13 to rest against the ejector 20. The collar 19 may then be lowered to the position shown in full lines in Fig. 1 and in its passage the beveled wall 21 will force the jaws 17 against the pins 18 into contact with the tap 15 which is thus securely and rigidly held in position.

Numerous changes in detail may be made without departing from the spirit of the invention.

I claim as my invention:

1. A rotary shaft, a longitudinally movable sleeve keyed at one end of the shaft, a pin on the shaft engaging a slot in the sleeve to limit the longitudinal movement of the sleeve on the shaft, a collar on the sleeve, means on the sleeve to limit the movement of the collar on the sleeve, a hollow head extending within the sleeve and adapted to be surrounded by the collar, jaws sliding transversely in the head, a seat in the collar holding the jaws in engagement with a drill in the head, an expanded cavity in the collar to permit the jaws to slide radially to release the drill, guide pins in the head for the jaws, and an ejector projecting from the shaft into the sleeve and actuated by the relative longitudinal movement of said shaft and sleeve to engage and eject the drill.

2. A rotary shaft, a sleeve sliding longitudinally on the shaft, a collar sliding longitudinally on the sleeve, a hollow head projecting from the sleeve, jaws in the head, means on the collar to operate the jaws to hold a drill, and an ejector projecting from the shaft into the sleeve and actuated by the relative longitudinal movement of said shaft and sleeve to engage and eject the drill.

FRANK W. TRENN.